US009243115B2

United States Patent
Kudo et al.

(10) Patent No.: US 9,243,115 B2
(45) Date of Patent: Jan. 26, 2016

(54) HYDROGEL FORMING COMPOSITION AND HYDROGEL PRODUCED THEREFROM

(71) Applicants: NISSAN CHEMICAL INDUSTRIES, LTD., Tokyo (JP); RIKEN, Wako, Saitama (JP)

(72) Inventors: Yoshihiro Kudo, Funabashi (JP); Taichi Nakazawa, Funabashi (JP); Takuzo Aida, Wako (JP); Yasuhiro Ishida, Wako (JP); Shingo Tamesue, Wako (JP); Masataka Ohtani, Wako (JP)

(73) Assignees: NISSAN CHEMICAL INDUSTRIES, LTD., Tokyo (JP); RIKEN, Saitama (JP)

( * ) Notice: Subject to any disclaimer, the term of this patent is extended or adjusted under 35 U.S.C. 154(b) by 0 days.

(21) Appl. No.: 14/429,196

(22) PCT Filed: Sep. 18, 2013

(86) PCT No.: PCT/JP2013/075175
§ 371 (c)(1),
(2) Date: Mar. 18, 2015

(87) PCT Pub. No.: WO2014/046136
PCT Pub. Date: Mar. 27, 2014

(65) Prior Publication Data
US 2015/0267007 A1    Sep. 24, 2015

(30) Foreign Application Priority Data
Sep. 18, 2012    (JP) .................................. 2012-205088

(51) Int. Cl.
*C08J 3/075*    (2006.01)
*C08L 71/02*    (2006.01)
(Continued)

(52) U.S. Cl.
CPC . *C08J 3/075* (2013.01); *C08K 3/32* (2013.01); *C08K 3/346* (2013.01); *C08L 31/00* (2013.01);
(Continued)

(58) Field of Classification Search
CPC ........ C08J 3/075; C08K 3/346; C08L 101/14; C08L 31/00
See application file for complete search history.

(56) References Cited

U.S. PATENT DOCUMENTS 8,957,145 B2 *  2/2015  Takeno et al. .................. 524/417
8,962,742 B2 *  2/2015  Takeno et al. .................. 524/560

FOREIGN PATENT DOCUMENTS

JP    2002-053629 A    2/2002
JP    2006-028446 A    2/2006
(Continued)

OTHER PUBLICATIONS

Tamesue, Shingo et al. "Jisedaigata Aquamaterial (Kogansuiritsu Kokyodo Hydrogel) no Sosei", Polymer Preprints, Japan. vol. 60 (2), pp. 5541-5542, 2011.
(Continued)

*Primary Examiner* — John Uselding
(74) *Attorney, Agent, or Firm* — Oliff PLC

(57) ABSTRACT

There is provided a hydrogel having a self-supporting property that can be produced only through mixing at room temperature, and there is provided a method by which the hydrogel can be manufactured by using industrially easily available raw materials. A hydrogel-forming composition that is capable of forming a hydrogel having a self-supporting property, the hydrogel-forming composition characterized by including: a water-soluble organic polymer having an organic acid salt structure or an organic acid anion structure; a silicate salt; and a dispersant for the silicate salt, having a weight average molecular weight of 200 to 20,000 and having hydrolysis resistance.

16 Claims, 4 Drawing Sheets

(51) Int. Cl.
*C08L 83/02* (2006.01)
*C08L 101/14* (2006.01)
*C08K 3/32* (2006.01)
*C08K 3/34* (2006.01)
*C08L 31/00* (2006.01)

(52) U.S. Cl.
CPC .............. *C08L 71/02* (2013.01); *C08L 83/02* (2013.01); *C08L 101/14* (2013.01); *C08J 2333/02* (2013.01); *C08J 2433/02* (2013.01); *C08K 2003/324* (2013.01)

(56) References Cited

FOREIGN PATENT DOCUMENTS

| | | |
|---|---|---|
| JP | 2009-127035 A | 6/2009 |
| JP | 2009-270048 A | 11/2009 |
| JP | 2009-274924 A | 11/2009 |
| JP | 2011-153174 A | 8/2011 |
| JP | 2012-036226 A | 2/2012 |
| WO | 2011/001657 A1 | 1/2011 |
| WO | 2012/023471 A1 | 2/2012 |

OTHER PUBLICATIONS

Takeno, Hiroyuki et al. "Structural and Mechanical Properties of Composite Hydrogel Composed of Polymer and Nanoparticle". Polymer Preprints, Japan. vol. 61, No. 1, p. 683, 2012.

Takeno, Hiroyuki et al. "Structural and Mechanical Properties of polyelectrolyte/clay composite gels". Polymer Preprints, Japan. vol. 61, No. 2, pp. 4367-4368, 2012.

Aida, Takuzo. "Aqua Materials: A Possible Direction of Material Design toward the Realization of a Low-Carbon Society." Kobunshi, vol. 59 (9), pp. 712-713, 2010.

Tamesue, Shingo et al. "Jisedaigata Aquamaterial (Kogansuiritsu Kokyodo Hydrogel) no Sosei." CSJ: The Chemical Society of Japan Koen Yokoshu. vol. 92 (3), p. 981, 2012.

Wang, Qigang et al. "High-water-content mouldable hydrogels by mixing clay and a dendritic molecular binder." Nature, 463, pp. 339-343, 2010.

Tamesue, Shingo et al. "Jisedaigata Aquamaterial (Kogansuiritsu Kokyodo Hydrogel) no Sosei." Polymer Preprints, Japan. vol. 61 (2), pp. 2613-2614, 2012.

Aida, Takuzo. "Yuki, Hybrid-kei Bottom up-gata Nano Kukan Zairyo no Sosei to sono Kino." SORST Symposium 4 Koen Yoshishu, pp. 17-20, 2010.

Labanda, Jordi et al. "Rheology changes of Laponite aqueous dispersions due to the addition of sodium polyacrylates of different molecular weights." Colloids and Surfaces A: Physicochem. Eng Aspects. vol. 301, pp. 8-15, 2007.

Aida, Takuzo. "Kinosei Soft Material ni Mukete no Cho Bunshi Kagaku." CSJ: The Chemical Society of Japan Koen Yokoshu. vol. 90 (1), p. 116, 2010.

Aida, Takuzo. "Mizu ga Plastic ni naru." JST News. vol. 6 (12), pp. 10-11, 2010.

Nov. 19, 2013 Written Opinion issued in International Application No. PCT/JP2013/075175.

Nov. 19, 2013 Search Report issued in International Application No. PCT/JP2013/075175.

\* cited by examiner

HYDROGEL FORMING COMPOSITION AND HYDROGEL PRODUCED THEREFROM

TECHNICAL FIELD

The present invention relates to a hydrogel, and in particular, to a hydrogel-forming composition and a hydrogel having a self-supporting property formed thereof.

BACKGROUND ART

Hydrogels have been recently attracting attention from the viewpoint that hydrogels are soft materials containing water as the main component and so having high biocompatibility, and having a low environmental load.

As a high-strength hydrogel having a self-supporting property, an organic/inorganic composite hydrogel is disclosed that is obtained by performing a polymerization reaction of a (meth)acrylamide derivative in the coexistence with a layered clay mineral that is uniformly dispersed in water (Patent Document 1). As a similar example disclosed, an organic/inorganic composite hydrogel is also known that contains a polymer partially containing a group of a carboxylate salt or a carboxy-anion structure in poly(meth)acrylamide and a clay mineral (Patent Document 2).

In these examples disclosed, monomers are polymerized in an aqueous dispersion of a layered clay mineral, thereby causing a generated polymer and the clay mineral to form a three-dimensional network structure, which forms the organic/inorganic composite hydrogels.

As an organic/inorganic composite hydrogel having a self-supporting property that can be manufactured through mixing at room temperature, a hydrogel is known that is obtained by mixing a dendrimer compound having a polycationic functional group at its terminal and a layered clay mineral (Patent Document 3 and Non-Patent Document 1).

A dry clay film having a self-standing property (self-supporting property) is known that contains a polyacrylate salt and a clay mineral and is under evaluation as a surface protective material (Patent Document 4).

A research is known that relates to viscosity changes in an aqueous dispersion of a layered clay mineral (silicate salt) and sodium polyacrylate (Non-Patent Document 2). This is not a research related to a self-supporting organic/inorganic composite hydrogel, but a research on rheological changes in the aqueous dispersion.

Organic/inorganic composite hydrogels have been recently disclosed that can be produced only by mixing a polyelectrolyte, clay particles, and a dispersant (Non-Patent Documents 3 and 4).

PRIOR ART DOCUMENTS

Patent Documents

Patent Document 1: Japanese Patent Application Publication No. 2002-053629 (JP 2002-053629 A)
Patent Document 2: Japanese Patent Application Publication No. 2009-270048 (JP 2009-270048 A)
Patent Document 3: WO 2011/001657
Patent Document 4: Japanese Patent Application Publication No. 2009-274924 (JP 2009-274924 A)

Non-Patent Documents

Non-Patent Document 1: T. Aida, et al., Nature 463, 339 (2010)

Non-Patent Document 2: Colloids and Surfaces, A Physicochemical and Engineering Aspects (2007), 301 (1-3), 8-15
Non-Patent Document 3: Preprints of the 61st Annual Meeting of the Society of Polymer Science of Japan, Vol. 61, No. 1, p. 683 (2012)
Non-Patent Document 4: Preprints of the 61st Symposium on Macromolecules, 1S11 (2012)

SUMMARY OF THE INVENTION

Problems to be Solved by the Invention

However, in the organic/inorganic composite hydrogels disclosed in Patent Document 1 and Patent Document 2, unreacted monomers that may be toxic and reagents such as a polymerization initiator may remain in the gels. It is difficult for non-chemical manufacturers to manufacture organic/inorganic composite hydrogels. It is also difficult to mold gels into a desired shape because hydrogels are formed after chemical reactions.

The hydrogels disclosed in Patent Document 3 and Non-Patent Document 1 have the issue that the manufacturing cost is high because the dendrimers contained in the hydrogels are manufactured through multi-step synthesis reactions.

Patent Document 4 discloses the production of a gel-like paste as an intermediate, which does not have a self-standing property. The gel-like paste is applied to a sheet, and a film after being dried has a self-standing property.

A presentation at a conference based on Non-Patent Document 3 and Non-Patent Document 4 disclose the use of sodium diphosphate (also known as sodium pyrophosphate) as a dispersant. The compound is unstable, and in the state where additives appropriate for the use of dispersions is added or in the state where the compound is stored for a long period of time, it gradually hydrolyzes to lose functionality as a dispersant, which makes gel production work difficult.

In view of the above, there is a demand for an organic/inorganic composite hydrogel that is safe, has a self-supporting property, and can be produced by using industrially easily available raw materials and simply mixing them at room temperature.

The present invention has been achieved in view of the above circumstances, and an object thereof is to provide a hydrogel having a self-supporting property that can be produced only through mixing at room temperature. Another object thereof is to provide a method by which the hydrogel can be manufactured by using industrially easily available raw materials.

Means for Solving the Problems

As a result of earnest study for resolving the above problems, the inventors of the present invention have found out that a hydrogel having a self-supporting property can be achieved by mixing a water-soluble organic polymer having an organic acid salt structure or an organic acid anion structure, a silicate salt, and a dispersant for the silicate salt, which has a weight average molecular weight of 200 to 20,000 and has hydrolysis resistance, and have achieved the present invention.

Specifically, the present invention relates to, as a first aspect, a hydrogel-forming composition that is capable of forming a hydrogel having a self-supporting property, the hydrogel-forming composition characterized by comprising: a water-soluble organic polymer (A) having an organic acid salt structure or an organic acid anion structure; a silicate salt (B); and a dispersant (C) for the silicate salt, having a weight average molecular weight of 200 to 20,000 and having hydrolysis resistance.

The present invention relates to, as a second aspect, the hydrogel-forming composition according to the first aspect, in which the dispersant (C) is a polycarboxylate salt-based dispersant.

The present invention relates to, as a third aspect, the hydrogel-forming composition according to the second aspect, in which the dispersant (C) is sodium polyacrylate or ammonium polyacrylate.

The present invention relates to, as a fourth aspect, the hydrogel-forming composition according to the first aspect, in which the dispersant (C) is a polyalkylene glycol-based dispersant.

The present invention relates to, as a fifth aspect, the hydrogel-forming composition according to the fourth aspect, in which the dispersant (C) is polyethylene glycol or polypropylene glycol.

The present invention relates to, as a sixth aspect, the hydrogel-forming composition according to any one of the first to fifth aspects, in which the water-soluble organic polymer (A) is a water-soluble organic polymer having a carboxylate salt structure or a carboxy anion structure.

The present invention relates to, as a seventh aspect, the hydrogel-forming composition according to the sixth aspect, in which the water-soluble organic polymer (A) is a fully neutralized or partially neutralized polyacrylate salt.

The present invention relates to, as an eighth aspect, the hydrogel-forming composition according to the seventh aspect, in which the water-soluble organic polymer (A) is a fully neutralized or partially neutralized polyacrylate salt having a weight average molecular weight of 1,000,000 to 10,000,000.

The present invention relates to, as a ninth aspect, the hydrogel-forming composition according to any one of the first to eighth aspects, in which the silicate salt (B) is a water-swellable silicate salt particle.

The present invention relates to, as a tenth aspect, the hydrogel-forming composition according to the ninth aspect, in which the silicate salt (B) is a water-swellable silicate salt particle selected from the group consisting of smectite, bentonite, vermiculite, and mica.

The present invention relates to, as an eleventh aspect, the hydrogel-forming composition according to any one of the first to tenth aspects, characterized by further comprising an alcohol.

The present invention relates to, as a twelfth aspect, a hydrogel having a self-supporting property, formed of the hydrogel-forming composition as described in any one of the first to eleventh aspects.

The present invention relates to, as a thirteenth aspect, a method for manufacturing a hydrogel having a self-supporting property, the method characterized by comprising: mixing the water-soluble organic polymer (A), the silicate salt (B), and the dispersant (C) each specified by any one of the first to tenth aspects and water or a water-containing solvent to cause a resultant mixture to gel.

The present invention relates to, as a fourteenth aspect, a method for manufacturing a hydrogel having a self-supporting property, the method characterized by comprising: mixing a mixture of the silicate salt (B) as described in any one of the first aspect, the ninth aspect, and the tenth aspect and the dispersant (C) as described in any one of the first to fifth aspects or an aqueous dispersion of the mixture and the water-soluble organic polymer (A) as described in any one of the first aspect and the sixth to eighth aspects or an aqueous solution of the water-soluble organic polymer (A) to cause a resultant mixture to gel.

The present invention relates to, as a fifteenth aspect, a method for manufacturing a hydrogel having a self-supporting property, the method characterized by comprising: mixing a mixture of the water-soluble organic polymer (A) as described in any one of the first aspect and the sixth to eighth aspects and the dispersant (C) as described in any one of the first to fifth aspects or an aqueous solution of the mixture and the silicate salt (B) as described in any one of the first aspect, the ninth aspect, and the tenth aspect or an aqueous dispersion of the silicate salt (B) to cause a resultant mixture gel.

The present invention relates to, as a sixteenth aspect, a method for manufacturing a hydrogel having a self-supporting property, the method characterized by comprising: mixing a mixture of the water-soluble organic polymer (A) as described in any one of the first aspect and the sixth to eighth aspects and the silicate salt (B) as described in any one of the first aspect, the ninth aspect, and the tenth aspect or an aqueous dispersion of the mixture and the dispersant (C) as described in any one of the first to fifth aspects or an aqueous solution of the dispersant (C) to cause a resultant mixture to gel.

Effects of the Invention

As described above, the present invention can provide a hydrogel having a self-supporting property only by mixing raw materials that are industrially easily available and are highly safe as used as cosmetics and quasi-drugs. By pouring the hydrogel-forming composition into a mold or extrusion-molding the hydrogel-forming composition before gelling, a gel having a desired shape can be produced. Any covalent bond forming reaction such as a polymerization reaction is not required on gelling, and the gel can be formed even at room temperature, which produces the effect of giving a high level of safety from the viewpoint of manufacturing processes. By adjusting the contents of the respective components, a hydrogel having transparency can be produced.

The manufacturing method according to the present invention uses a dispersion in which a silicate salt and a dispersant for the silicate salt are mixed. Even though the dispersion is an extremely stable sol compared to a dispersion using a phosphate salt-based dispersant, the addition of the water-soluble organic polymer can produce a high-strength hydrogel.

The manufacturing method according to the present invention can produce a high-strength hydrogel by adding the water-soluble organic polymer even when pH regulators, preservatives, or additives appropriate for uses are added to the sol.

MODES FOR CARRYING OUT THE INVENTION

Figure 1:
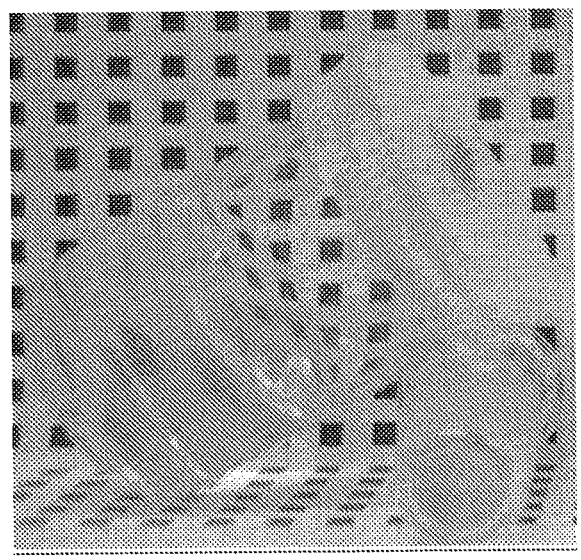
FIG. 1 is a photograph of a hydrogel obtained in Example 1.

The present invention relates to a hydrogel-forming composition that can form a hydrogel having a self-supporting property, the hydrogel-forming composition characterized by comprising a water-soluble organic polymer (A) having an organic acid salt structure or an organic acid anion structure, a silicate salt (B), and a dispersant (C) for the silicate salt, which has a weight average molecular weight of 200 to 20,000 and has hydrolysis resistance.

The hydrogel-forming composition and the hydrogel formed thereof according to the present invention may contain, in addition to the above components (A) to (C), any other components as necessary to the extent that the intended effect of the present invention is not impaired.

[Hydrogel-Forming Composition]

<Component (A): Water-Soluble Organic Polymer>

The component (A) according to the present invention is a water-soluble organic polymer having an organic acid salt structure or an organic acid anion structure.

Examples of the water-soluble organic polymer (A) having an organic acid salt structure or an organic acid anion structure include, as ones having a carboxy group, poly(meth)acrylate salts, salts of carboxyvinyl polymers, and salts of carboxymethyl cellulose; as one having a sulfonyl group, polystyrene sulfonate salts; and, as one having a phosphonyl group, polyvinyl phosphonate salts. Examples of the salts include sodium salts, ammonium salts, potassium salts, and lithium salts. The (meth)acrylic acid in the present invention refers to both acrylic acid and methacrylic acid.

The water-soluble polymer (A) may be cross-linked or copolymerized, and both fully neutralized products and partially neutralized products thereof can be used.

The weight average molecular weight of the water-soluble organic polymer (A) measured by gel permeation chromatography (GPC) is, in terms of polyethylene glycol, preferably 1,000,000 to 10,000,000, and the weight average molecular weight is more preferably 2,000,000 to 7,000,000.

Water-soluble organic polymers available as commercial products have a weight average molecular weight, as labelled on the commercial products, of preferably 1,000,000 to 10,000,000, and the weight average molecular weight is more preferably 2,000,000 to 7,000,000.

In the present invention, the water-soluble polymer (A) is preferably a water-soluble organic polymer compound having a carboxylate salt structure or a carboxy anion structure and is particularly preferably a fully neutralized or partially neutralized polyacrylate salt. Specifically, the water-soluble polymer (A) is preferably a fully neutralized or partially neutralized sodium polyacrylate and is particularly preferably a fully neutralized or partially neutralized non-cross-linked sodium polyacrylate of high polymerization degree having a weight average molecular weight of 2,000,000 to 7,000,000.

The content of the water-soluble organic polymer (A) is 0.01% by mass to 20% by mass and preferably 0.1% by mass to 10% by mass relative to 100% by mass of the hydrogel.

<Component (B): Silicate Salt>

The component (B) according to the present invention is a silicate salt and is preferably a water-swellable silicate salt particle.

Examples of the silicate salt (B) include smectite, bentonite, vermiculite, and mica, which preferably form a colloid with water or a water-containing solvent as a dispersant. The smectite is a group name of montmorillonite, beidellite, nontronite, saponite, hectorite, stevensite, and the like.

Examples of the shape of primary particles of the silicate salt particle include disc-like, plate-like, spherical, particulate, cubic, needle-like, rod-like, and amorphous. Disc-like or plate-like shape having a diameter of 5 nm to 1,000 nm is preferable.

Preferable specific examples of the silicate salt (B) include a layered silicate salt; examples thereof easily available as commercial products include LAPONITE (registered trademark of Rockwood Additives Ltd.) XLG (synthetic hectorite), XLS (synthetic hectorite containing sodium pyrophosphate as a dispersant), XL21 (sodium magnesium fluorosilicate), RD (synthetic hectorite), RDS (synthetic hectorite containing an inorganic polyphosphate salt as a dispersant), and S482 (synthetic hectorite containing a dispersant) manufactured by Rockwood Additives Ltd.; LUCENTITE (registered trademark of Co-op Chemical Co., Ltd.) SWN (synthetic smectite) and SWF (synthetic smectite), micro mica (synthetic mica), and SOMASIF (registered trademark of Co-op Chemical Co., Ltd., synthetic mica) manufactured by Co-op Chemical Co., Ltd.; KUNIPIA (registered trademark of Kunimine Industries Co., Ltd., montmorillonite), SUMECTON (registered trademark of Kunimine Industries Co., Ltd.) SA (synthetic saponite) manufactured by Kunimine Industries Co., Ltd.; and BEN-GEL (registered trademark of Hojun Co., Ltd., a refined product of natural bentonite) manufactured by Hojun Co., Ltd.

The content of the silicate salt (B) is 0.01% by mass to 20% by mass and preferably 0.1% by mass to 15% by mass relative to 100% by mass of the hydrogel.

<Component (C): Dispersant for Silicate Salt>

The component (C) according to the present invention is the dispersant (C) for a silicate salt having a weight average molecular weight of 200 to 20,000 and having hydrolysis resistance, and dispersants or peptizers used for the purpose of improving the dispersability of silicate salts and delaminating layered silicate salts can be used.

Examples of the dispersant (C) include, as polycarboxylate salt-based dispersants, sodium poly(meth)acrylate, ammonium poly(meth)acrylate, poly(sodium acrylate-co-sodium maleate), and poly(ammonium acrylate-co-ammonium maleate); and, as polyalkylene glycol-based dispersants, polyethylene glycol (PEG 900 or the like) and polypropylene glycol.

The polycarboxylate salt-based dispersants and the polyalkylene glycol-based dispersants are preferable. The polycarboxylate salt-based dispersants more preferably have a weight average molecular weight of 1,000 to 20,000.

Specifically, a sodium polyacrylate or an ammonium polyacrylate having a weight average molecular weight of 1,000 to 20,000 is preferable as one of the polycarboxylate salt-based dispersants. A polyethylene glycol (PEG 900 or the like) having a weight average molecular weight of 200 to 20,000 is preferable as one of the polyalkylene glycol-based dispersants.

It is known that a polyacrylate salt of low polymerization degree having a weight average molecular weight of 1,000 to 20,000 functions as a dispersant by a mechanism including producing negative electric charges originated from carboxy anions on the surface of the particles through interactions with silicate salt particles and dispersing the silicate salt through the repulsion of the electric charges.

The content of the dispersant (C) is 0.001% by mass to 20% by mass and preferably 0.01% by mass to 10% by mass relative to 100% by mass of the hydrogel.

In the present invention, when using a silicate salt containing a dispersant as the component (B), the dispersant of the component (C) may be further added or may not be added.

A preferable combination of the water-soluble organic polymer (A), the silicate salt (B), and the dispersant (C) is: relative to 100% by mass of the hydrogel, 0.1% by mass to 10% by mass of a fully neutralized or partially neutralized non-cross-linked sodium polyacrylate of high polymerization degree having a weight average molecular weight of 2,000,000 to 7,000,000 as the component (A); 0.1% by mass to 15% by mass of water-swellable smectite or saponite as the component (B); and 0.01% by mass to 10% by mass of a polyacrylate salt having a weight average molecular weight of 1,000 to 20,000 or a polyethylene glycol having a weight average molecular weight of 200 to 20,000 as the component (C).

The hydrogel-forming composition according to the present invention may contain monohydric or polyhydric alcohols such as methanol, ethanol, and glycol, formamide, hydrazine, dimethyl sulfoxide, urea, acetamide, potassium acetate, and the like that are intercalated between layers of the layered silicate salt to promote delamination.

<Component (D): Alcohol>

The hydrogel-forming composition according to the present invention may contain an alcohol as a component (D). The alcohol may be a monohydric alcohol or a polyhydric alcohol.

The monohydric alcohol is preferably a water-soluble alcohol freely soluble in water and is more preferably a $C_{1-8}$ alcohol; specific examples thereof include methanol, ethanol, 2-propanol, i-butanol, pentanols, hexanols, 1-octanol, and iso-octanol.

The polyhydric alcohol is a dihydric or higher hydric alcohol; examples thereof include glycerin, polyglycerins (diglycerin, triglycerin, tetraglycerin, and the like), ethylene glycol, propylene glycol, diethylene glycol, triethylene glycol, tetraethylene glycol, dipropylene glycols, 1,5-pentanediol (pentamethylene glycol), 1,2,6-hexanetriol, octylene glycol (ethohexadiol), butylene glycols (1,3-butylene glycol, 1,4-butylene glycol, 2,3-butanediol, and the like), hexylene glycols, 1,3-propanediol (trimethylene glycol), and 1,6-hexanediol (hexamethylene glycol). Glycerin, diglycerin, ethylene glycol, and propylene glycol are preferable.

The content of the alcohol is 0% by mass to 99% by mass and preferably 0% by mass to 60% by mass relative to 100% by mass of the hydrogel.

[Hydrogel and Method for Manufacturing the Same]

The hydrogel according to the present invention is obtained by causing the hydrogel-forming composition to gel.

The gelling of the hydrogel-forming composition can be achieved by mixing a mixture of two components of the hydrogel-forming composition, an aqueous solution thereof, or an aqueous dispersion thereof and the remaining one component, an aqueous solution thereof, or an aqueous dispersion thereof. The gelling can also be achieved by adding water to a mixture of the components.

A method for mixing the components of the hydrogel-forming composition can be mechanical or manual stirring or ultrasonication, and among them, the mechanical stirring is preferable. In the mechanical stirring, for example, magnetic stirrers, propeller type stirrers, planetary centrifugal mixers, dispersers, homogenizers, shakers, vortex mixers, ball mills, kneaders, ultrasonic oscillators, line mixers, or the like can be used. Among them, mixing with planetary centrifugal mixers is preferable.

The temperature during mixing ranges from the freezing point to the boiling point of an aqueous solution or an aqueous dispersion, which is preferably −5° C. to 100° C. and more preferably 0° C. to 50° C.

Although the mixture is weak in strength and is a sol immediately after mixing, it gels after being allowed to stand still. The time during which the mixture is allowed to stand still is preferably 2 hours to 100 hours. The temperature at which the mixture is allowed to stand still is −5° C. to 100° C. and preferably 0° C. to 50° C. By pouring the mixture into a mold or extrusion-molding the mixture before the gelling immediately after mixing, a gel having a desired shape can be produced.

The term "self-supporting property" of a hydrogel is usually used without being defined in academic papers and patent documents. In the present specification, the term is used to mean that, by having a sufficient strength, gel can retain its shape even without a support such as a container.

The strength of a hydrogel obtained can be measured with a piercing rupture strength measuring apparatus, for example. For example, a cylindrical hydrogel having a diameter of 28 mm and a height of 16 mm is produced, and measurement can be performed with CREEP METER RE2-33005B manufactured by Yamaden Co., Ltd. The method of measurement includes pressing a 3-mm diameter cylindrical shaft (a plunger manufactured by Yamaden Co., Ltd., shape: cylinder, No. 4S, model: P-4S) against the top of the gel with a speed of 1 mm/second and measuring the stress before rupture. The rupture stress of a hydrogel obtained in the present invention with the piercing rupture strength measuring apparatus is 5 kPa to 10,000 kPa. For uses requiring high strength, examples of the lower limit value thereof include 25 kPa, 300 kPa, and 600 kPa, and examples of the upper limit value thereof include 1,300 kPa, 2,000 kPa, and 5,000 kPa. Examples thereof include 300 kPa to 1,300 kPa and 600 kPa to 1,300 kPa.

EXAMPLES

The present invention will be described specifically with reference to examples. The present invention is not limited to the examples.

Example 1

Manufacture of 3% LAPONITE XLG Hydrogel using Sodium Polyacrylate Dispersion

Three parts of LAPONITE XLG (manufactured by Rockwood Additives Ltd.), 3 parts of a sodium polyacrylate of low polymerization degree (having a weight average molecular weight of 8,000, manufactured by Sigma-Aldrich Corporation), and 44 parts of water were mixed and stirred at 25° C. with a magnetic stirrer until a uniform aqueous dispersion was produced. Meanwhile, 1 part of a sodium polyacrylate of high polymerization degree (ARONVIS MX manufactured by Toagosei Co., Ltd., having a weight average molecular weight of 2,000,000 to 3,000,000) and 49 parts of water were mixed and stirred at 25° C. with a magnetic stirrer until a uniform aqueous solution was produced.

These two liquids were mixed, stirred at 25° C. at 2,000 rpm for 10 minutes with a planetary centrifugal mixer (ARE- 310 manufactured by Thinky Corporation), and were allowed to stand still for 24 hours to obtain a highly transparent hydrogel as shown in FIG. 1.

Example 2

Piercing Strength Test on Hydrogel

Figure 2:
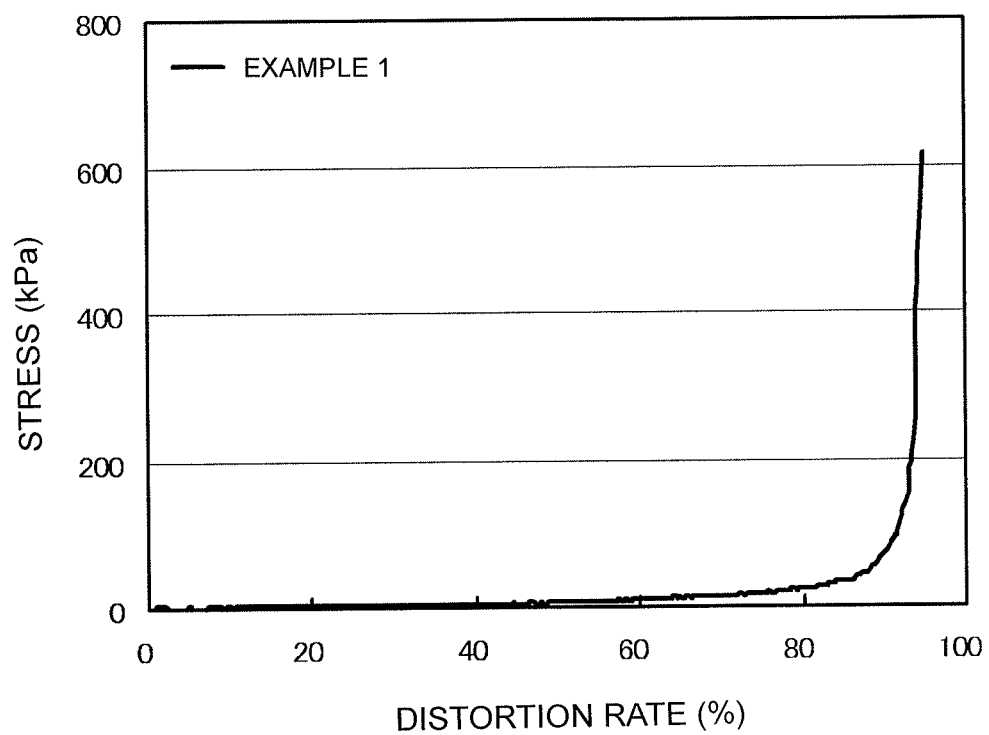
FIG. 2 is a diagram showing a measurement result of rupture stress in Example 2.

A cylindrical hydrogel having a diameter of 28 mm and a height of 16 mm was produced on the conditions of Example 1, and piercing strength measurement was performed thereon with CREEP METER RE2-33005B manufactured by Yamaden Co., Ltd. In the measurement, a 3-mm diameter cylindrical shaft (a plunger manufactured by Yamaden Co., Ltd., shape: cylinder, No. 3S, model: P-3S) was pressed against the top of the gel with a speed of 1 mm/second, and the distortion rate and the stress before rupture were measured. The measurement result is shown in FIG. 2 and Table 1.

TABLE 1

| Example | Rupture stress [kPa] | Distortion rate [%] |
|---|---|---|
| 1 | 615 | 95 |

Example 3

Manufacture of Hydrogel with 1% Sodium Chloride Added Using Sodium Polyacrylate Dispersion Three parts of LAPONITE XLG (manufactured by Rockwood Additives Ltd.), 1 part of a sodium polyacrylate of low polymerization degree (having a weight average molecular weight of 8,000, manufactured by Sigma-Aldrich Corporation), 1 part of sodium chloride (manufactured by Kanto Chemical Co., Inc.), and 45 parts of water were mixed and stirred at 25° C. with a magnetic stirrer until a uniform aqueous dispersion was produced. Meanwhile, 1 part of a sodium polyacrylate having a weight average molecular weight of 2,000,000 to 3,000,000 (ARONVIS MX manufactured by Toagosei Co., Ltd.) and 49 parts of water were mixed and stirred at 25° C. with a magnetic stirrer until a uniform aqueous solution was produced.

Figure 3:
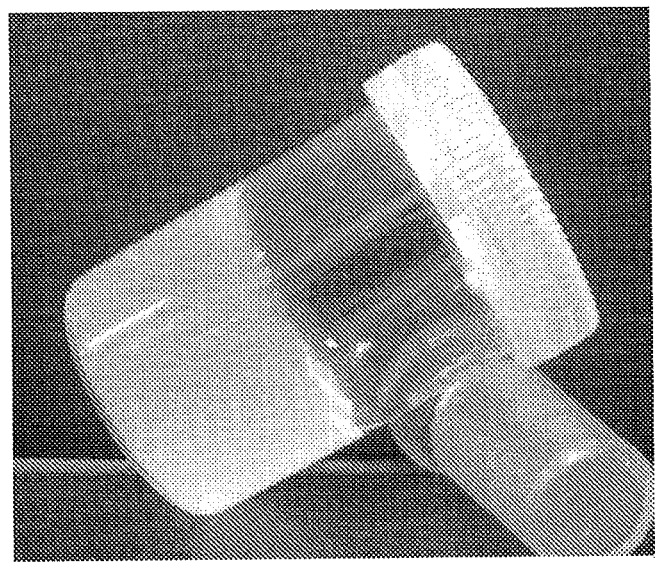
FIG. 3 is a photograph of a hydrogel obtained in Example 3.

These two liquids were mixed, stirred at 25° C. at 2,000 rpm for 5 minutes with the planetary centrifugal mixer (ARE-310 manufactured by Thinky Corporation), and then allowed to stand still for 24 hours to obtain a hydrogel as shown in FIG. 3.

Comparative Example 1

Manufacture of Hydrogel with 1% Sodium Chloride Added using Sodium Pyrophosphate Dispersion Three parts of LAPONITE XLG (manufactured by Rockwood Additives Ltd.), 1 part of sodium pyrophosphate decahydrate (manufactured by Junsei Chemical Co., Ltd.), 1 part of sodium chloride (manufactured by Kanto Chemical Co., Inc.), and 45 parts of water were mixed and stirred at 25° C. with a magnetic stirrer until a uniform aqueous dispersion was produced. Meanwhile, 1 part of a sodium polyacrylate having a weight average molecular weight of 2,000,000 to 3,000,000 (ARONVIS MX manufactured by Toagosei Co., Ltd.) and 49 parts of water were mixed and stirred at 25° C. with a magnetic stirrer until a uniform aqueous solution was produced.

Figure 4:
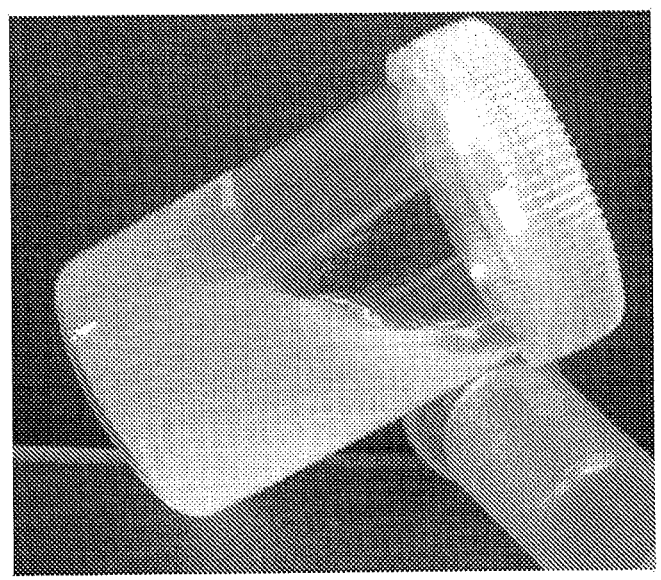
FIG. 4 is a photograph of a viscous substance obtained in Comparative Example 1.

These two liquids were mixed, stirred at 25° C. at 2,000 rpm for 5 minutes with the planetary centrifugal mixer (ARE-310 manufactured by Thinky Corporation), and then allowed to stand still for 24 hours. A viscous substance as shown in FIG. 4 was obtained with no hydrogel obtained.

Comparative Manufacturing Example 1

Figure 5:
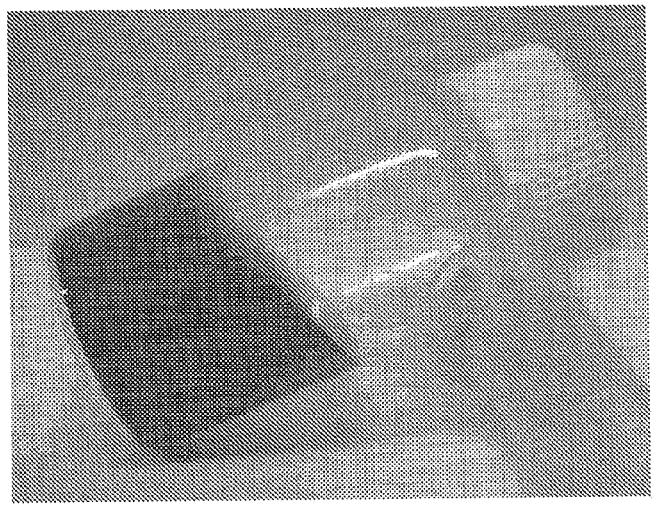
FIG. 5 is a photograph of a semi-solid (paste-like) dispersion obtained in Comparative Manufacturing Example 1.

Manufacture of 6% LAPONITE XLG-High Polymerization Degree Sodium Polyacrylate Dispersion Six parts of LAPONITE XLG (manufactured by Rockwood Additives Ltd.), 1 part of sodium polyacrylate having a weight average molecular weight of 2,000,000 to 3,000,000 (ARONVIS MX manufactured by Toagosei Co., Ltd.), 6 parts of urea (manufactured by Wako Pure Chemical Industries, Ltd.), and 81.8 parts of water were mixed and stirred at 80° C. with a magnetic stirrer until a uniform aqueous dispersion was produced. Two-tenths part of citric acid (manufactured by Junsei Chemical Co., Ltd.) and 1 part of phenoxyethanol (manufactured by I. T. O. Co., Ltd.) were added thereto, and the mixture was stirred at 80° C. with a magnetic stirrer until a uniform aqueous dispersion was produced and cooled to 25° C. to obtain a semi-solid (paste-like) dispersion as shown in FIG. 5.

Comparative Example 2

Figure 6:
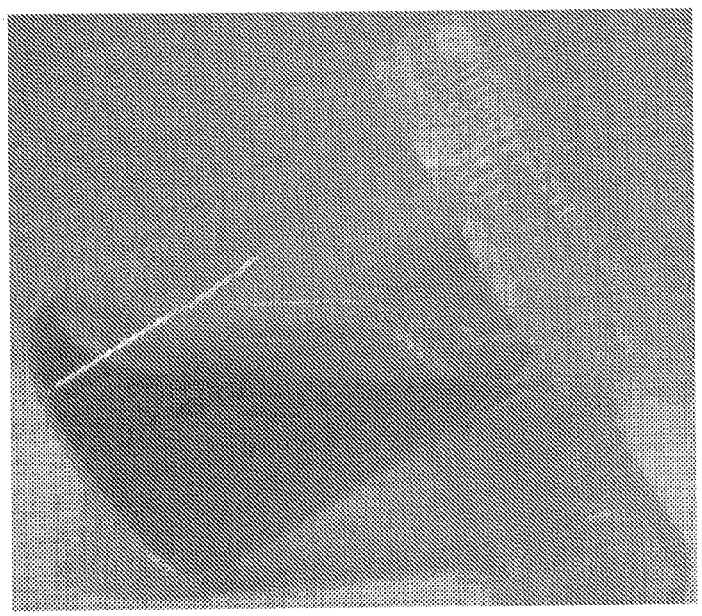
FIG. 6 is a photograph of a viscous substance obtained in Comparative Example 2.

Manufacture of 3% LAPONITE XLG Hydrogel from 6% LAPONITE XLG-High Polymerization Degree Sodium Polyacrylate Dispersion One part of a sodium polyacrylate of low polymerization degree (having a weight average molecular weight of 8,000, manufactured by Sigma-Aldrich Corporation) and 49 parts of water were mixed and stirred at 25° C. with a magnetic stirrer until a uniform aqueous dispersion was produced. Fifty parts of the dispersion obtained in Comparative Manufacturing Example 1 was added thereto, and the mixture was stirred at 25° C. at 2,000 rpm for 10 minutes with the planetary centrifugal mixer (ARE-310 manufactured by Thinky Corporation) and was allowed to stand still for 24 hours. A viscous substance as shown in FIG. 6 was obtained with no hydrogel obtained.

Reference Example 1

Manufacture of 6% LAPONITE XLG-Sodium Polyacrylate Dispersion

Six parts of LAPONITE XLG (manufactured by Rockwood Additives Ltd.), 1 part of a low polymerization degree sodium polyacrylate (having a weight average molecular weight of 8,000, manufactured by Sigma-Aldrich Corporation), 6 parts of urea (manufactured by Wako Pure Chemical Industries, Ltd.), and 85.8 parts of water were mixed and stirred at 25° C. with a magnetic stirrer until a uniform aqueous dispersion was produced. Two-tenths part of citric acid (manufactured by Junsei Chemical Co., Ltd.) and 1 part of phenoxyethanol (manufactured by I. T. O. Co., Ltd.) were added thereto, and the mixture was stirred at 25° C. with a magnetic stirrer until a uniform aqueous dispersion was produced to obtain a uniform dispersion. The pH of the dispersion was 7.

Reference Example 2

Manufacture of 6% LAPONITE XLG-Sodium Pyrophosphate Dispersion

Six parts of LAPONITE XLG (manufactured by Rockwood Additives Ltd.), 1 part of sodium pyrophosphate decahydrate (manufactured by Junsei Chemical Co., Ltd.), 6 parts of urea (manufactured by Wako Pure Chemical Industries, Ltd.), and 85.8 parts of water were mixed and stirred at 25° C. with a magnetic stirrer until a uniform aqueous dispersion was produced. Two-tenths part of citric acid (manufactured by Junsei Chemical Co., Ltd.) and 1 part of phenoxyethanol (manufactured by I. T. O. Co., Ltd.) were added and stirred at 25° C. with a magnetic stirrer until a uniform aqueous dispersion was produced to obtain a uniform dispersion. The pH of the dispersion was 7.

Reference Example 3

Storage Stability Test on 6% LAPONITE XLG Dispersion

Figure 7:
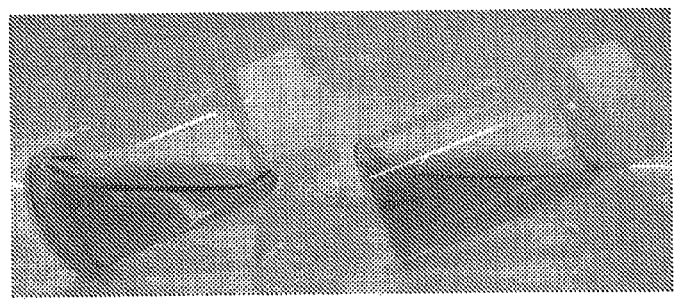
FIG. 7 is a photograph (right: Reference Example 1, left: Reference Example 2) of a dispersion before a storage stability test in Reference Example 3.
Figure 8:
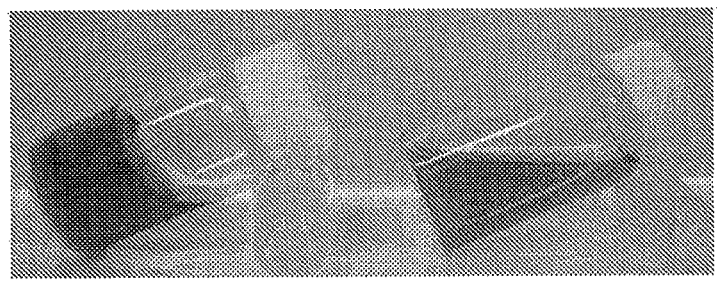
FIG. 8 is a photograph (right: Reference Example 1, left: Reference Example 2) of the dispersion after the storage stability test in Reference Example 3.

The dispersions obtained in Reference Example 1 and Reference Example 2 were allowed to stand still at 40° C. for 3 days. FIG. 7 shows a photograph before the test (the right hand of the photograph is Reference Example 1, and the left hand is Reference Example 2), whereas FIG. 8 shows a photograph after the test (the right hand of the photograph is Reference Example 1, and the left hand is Reference Example 2). The dispersion of Reference Example 1 showed no change, whereas the dispersion of Reference Example 2 lost dispersability and solidified through the hydrolysis of sodium pyrophosphate, and its pH changed to 8.

INDUSTRIAL APPLICABILITY

In the hydrogel having a self-supporting property according to the present invention, the viscoelasticity such as rupture strength and deformation rate of the hydrogel can be adjusted and its self-supporting property can be maintained even with such a high water content exceeding 95%, depending on its raw material constitution. The hydrogel having a self-supporting property according to the present invention can gel at room temperature and can be formed into a desired shape. The hydrogel having a self-supporting property according to the present invention can be used in various products utilizing its characteristics.

Examples of the products include medical materials such as external medicine bases such as wound dressing, cataplasms, and hemostatic materials, sealant materials for surgery, scaffolding materials for regenerative medicine, implant materials such as artificial corneas, artificial lenses, artificial vitreous bodies, artificial skin, artificial joints, artificial cartilage, materials for breast augmentation, and materials for soft contact lenses; medium materials for tissue culturing, microbial culturing, and the like; cosmetic materials such as lotions, milky lotions, cream, liquid foundation, sunscreen, foundation, partial makeup, facial cleansers, skin cleansers, shampoo, conditioner, styling agents, hair dye, cleansing agents, and sheets for packing; sanitary materials such as diapers for children and adults and sanitary napkins; gel materials for aromatics and deodorants; confectionery and gum materials for dogs; materials for chromatographic carriers; materials for bioreactor carriers; materials for separation membranes; building/construction materials such as noncombustible materials for construction, fireproofing covering materials, humidity control materials, seismic buffer materials, mudflow preventing materials, and sandbags; greening materials such as soil water retention agents, raising media, and agricultural and horticultural hydroponic supports; toy materials such as children's toys and models; materials for stationeries; shock absorbing materials for sporting goods such as sports shoes and protectors; cushion materials for shoe soles; buffer materials for bulletproof vests; buffer materials for automobiles and the like; buffer materials for transportation; packing materials; buffering/protecting mat materials; buffering within electronic devices; buffer materials for transporting wagons for precision components such as optical devices and semiconductor-related components; vibration-proof/damping materials for industrial equipment; sound reduction materials for industrial equipment such as motor-using equipment and compressors; coating materials for frictional parts of environment-conscious material apparatuses such as alternative materials for rubber for tires and rubber bands and alternative materials for plastics; coating additives; waste disposal such as gelators for waste mud and lost circulation preventing agents; adhesives; sealants for sealing; electronic materials such as gel electrolyte materials for primary cells, secondary cells, and capacitors, gel electrolyte materials for dye-sensitized solar cells, and materials for fuel cells; and materials for photographic films.

The invention claimed is:

1. A hydrogel-forming composition that is capable of forming a hydrogel having a self-supporting property, the hydrogel-forming composition comprising:
   a water-soluble organic polymer having an organic acid salt structure or an organic acid anion structure;
   a silicate salt; and
   a dispersant for the silicate salt, having a weight average molecular weight of 200 to 20,000 and having hydrolysis resistance.

2. The hydrogel-forming composition according to claim 1, wherein
   the dispersant is a polycarboxylate salt-based dispersant.

3. The hydrogel-forming composition according to claim 2, wherein
   the dispersant is sodium polyacrylate or ammonium polyacrylate.

4. The hydrogel-forming composition according to claim 1, wherein
   the dispersant is a polyalkylene glycol-based dispersant.

5. The hydrogel-forming composition according to claim 4, wherein
   the dispersant is polyethylene glycol or polypropylene glycol.

6. The hydrogel-forming composition according to claim 1, wherein
   the water-soluble organic polymer is a water-soluble organic polymer having a carboxylate salt structure or a carboxy anion structure.

7. The hydrogel-forming composition according to claim 6, wherein
   the water-soluble organic polymer is a fully neutralized or partially neutralized polyacrylate salt.

8. The hydrogel-forming composition according to claim 7, wherein
   the water-soluble organic polymer is a fully neutralized or partially neutralized polyacrylate salt having a weight average molecular weight of 1,000,000 to 10,000,000.

9. The hydrogel-forming composition according to claim 1, wherein
   the silicate salt is a water-swellable silicate salt particle.

10. The hydrogel-forming composition according to claim 9, wherein
the silicate salt is a water-swellable silicate salt particle selected from the group consisting of smectite, bentonite, vermiculite, and mica.

11. The hydrogel-forming composition according to claim 1, further comprising an alcohol.

12. A hydrogel having a self-supporting property, formed of the hydrogel-forming composition as claimed in claim 1.

13. A method for manufacturing a hydrogel having a self-supporting property, the method comprising:
mixing the water-soluble organic polymer the silicate sale, and the dispersant each specified by claim 1, and water or a water-containing solvent to cause a resultant mixture to gel.

14. A method for manufacturing a hydrogel having a self-supporting property, the method comprising:
mixing a mixture of the silicate salt according to claim 1, and the dispersant or an aqueous dispersion of the mixture and the water-soluble organic polymer or an aqueous solution of the water-soluble organic polymer to cause a resultant mixture to gel.

15. A method for manufacturing a hydrogel having a self-supporting property, the method comprising:
mixing a mixture of the water-soluble organic polymer as claimed in claim 1, and the dispersant or an aqueous solution of the mixture and the silicate salt or an aqueous dispersion of the silicate salt to cause a resultant mixture to gel.

16. A method for manufacturing a hydrogel having a self-supporting property, the method comprising:
mixing a mixture of the water-soluble organic polymer as claimed in claim 1, and the silicate salt or an aqueous dispersion of the mixture and the dispersant or an aqueous solution of the dispersant to cause a resultant mixture to gel.

* * * * *